Figure 1:
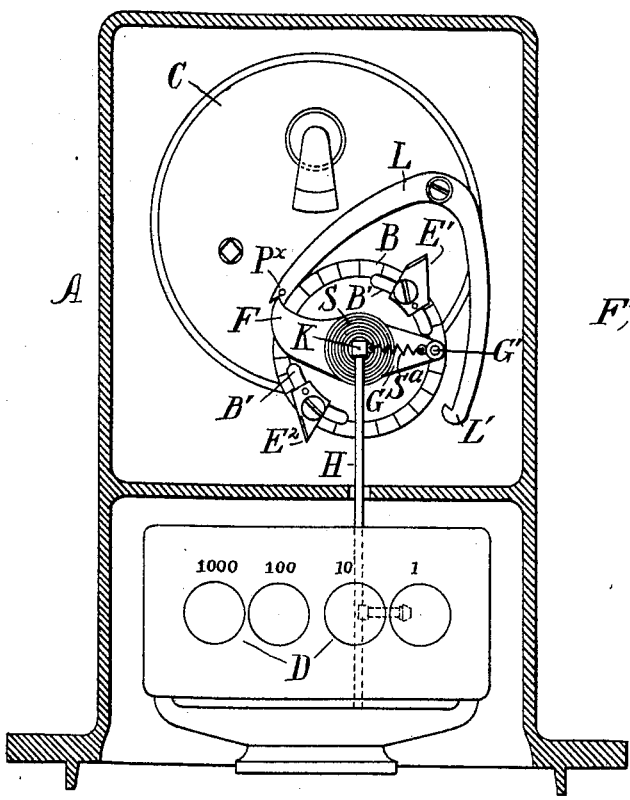

No. 771,207. PATENTED SEPT. 27, 1904.
G. KAPP.
APPARATUS FOR REGISTERING THE SUPPLY OF ELECTRICITY.
APPLICATION FILED DEC. 31, 1897.
NO MODEL. 3 SHEETS—SHEET 1.

Witnesses:
C. L. Belcher
Wm. H. Capel

Inventor
Gisbert Kapp
By
Attorney

No. 771,207. PATENTED SEPT. 27, 1904.
G. KAPP.
APPARATUS FOR REGISTERING THE SUPPLY OF ELECTRICITY.
APPLICATION FILED DEC. 31, 1897.
NO MODEL. 3 SHEETS—SHEET 2.

Witnesses
C L Belcher
Wm H Capel

Inventor
Gisbert Kapp
By
L. C. Townsend
Attorney

No. 771,207. Patented September 27, 1904.

UNITED STATES PATENT OFFICE.

GISBERT KAPP, OF BERLIN, GERMANY.

APPARATUS FOR REGISTERING THE SUPPLY OF ELECTRICITY.

SPECIFICATION forming part of Letters Patent No. 771,207, dated September 27, 1904.

Original application filed November 19, 1897, Serial No. 659,145. Divided and this application filed December 31, 1897. Serial No. 665,123. (No model.)

*To all whom it may concern:*

Be it known that I, GISBERT KAPP, a subject of the Queen of Great Britain, residing at Berlin, Germany, have invented Improvements in Methods of and Apparatus for Registering the Supply of Electricity, (for which Letters Patent of the Kingdom of Great Britain and Ireland were granted to me April 7, 1892, No. 6,707,) of which the following is a specification.

My invention relates to apparatus for registering or metering the consumption of electrical energy distributed from any point to consumers; and the object of the invention is to provide a convenient means whereby the electric energy consumed during certain hours of the day by individual consumers may be metered or ascertained and charged for at a different rate from that consumed or used at other periods.

My present invention is for one of the ways of carrying out the broad invention set forth in my original application for patent filed November 19, 1897, Serial No. 659,145, and my present application is a division of the said original application.

My present invention consists, substantially, in registering or recording the consumption of energy at the different periods on the same device or apparatus and in combining with the same suitable means for changing or varying the speed or rate of operation of said device or apparatus at the beginning and end of the period for which a different rate of charge is to be made.

There are various ways in which the invention may be carried out. My invention may be carried out either mechanically by the introduction of changeable-speed gear between the driving-shaft and the dial when the record or registry is kept by dial or counter or electrically by changing the electrical operation of the meter whatever the means employed for preserving a record or registry of the amount of electricity consumed or by changing the speed of operation of the device in any other desired manner. The change in the operation of the apparatus, whether made mechanically or electrically, may be made by any desired means, and preferably by means controlled by a clock.

Another feature of the present invention, which is applicable to two-rate meters generally, whether the consumption is kept as one record for the two periods or as a separate record for each period, consists in providing the clock which controls the change-over mechanism with operating or controlling devices independently adjustable in position to vary the period of altered operation.

There are various ways in which I may attain the objects of my invention. According to one method, which is purely mechanical, the clock is provided with a hand which makes one revolution in twenty-four hours. A pin on this hand engages with a link at the end of the rod attached to a tumbling-lever that acts upon a small clutch-coupling on the main shaft of the meter. There being one set of dials I insert between it and the main shaft a counter-shaft with suitable differential gear controlled by the coupling above mentioned. I may also employ instead of the coupling a friction-wheel between two parallel disks with their axes parallel, but not in line. The speed ratio between the two disks will depend upon the position of the friction-wheel that transmits the motion of one disk to the other. The position of the friction-wheel is controlled by the clock and slotted connecting-rod above mentioned. One of the disks receives motion from the main shaft, and the other transmits motion to the counter, and by means of the friction-wheel or any other equivalent mechanical device I am able to vary the speed ratio between counter and meter as may be required to effect the desired change in the speed or rate of operation of the meter apparatus when operating to record the consumption of energy that is to be charged for at a different or reduced rate. Another method, which is partly mechanical and partly electrical, consists in employing the clock as a relay for sending a current through an electromagnet, solenoid, electromotor, or other electromagnetic device at the proper time and arranging the said device in such a manner that it shall either act mechanically on the gear connecting the meter with the counter, as above explained, or that it shall act electrically by moving a switch connected with the coils or other electrical parts of the motor to cut out or otherwise affect an operative circuit of the meter, so as to change the rate of driving. Also I cause the clock to act mechanically upon the electric switch that effects the speed of operation of the electric driving portion of the apparatus. In this case the power for working the mechanical gear or the switch is derived from the supply-current, and I may also use the power of the supply-current for making the clock self-winding. For the convenience of the consumer and to show whether the apparatus is in working order I may combine with the meter an index, showing at any time the rate at which the meter registers or, if preferred, the charge made at that time per board-of-trade unit.

Figure 2:
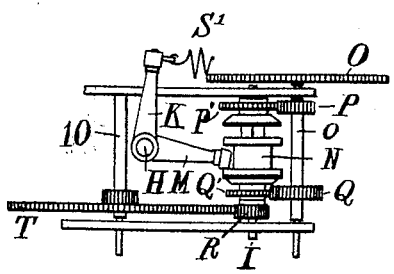
Figure 3:
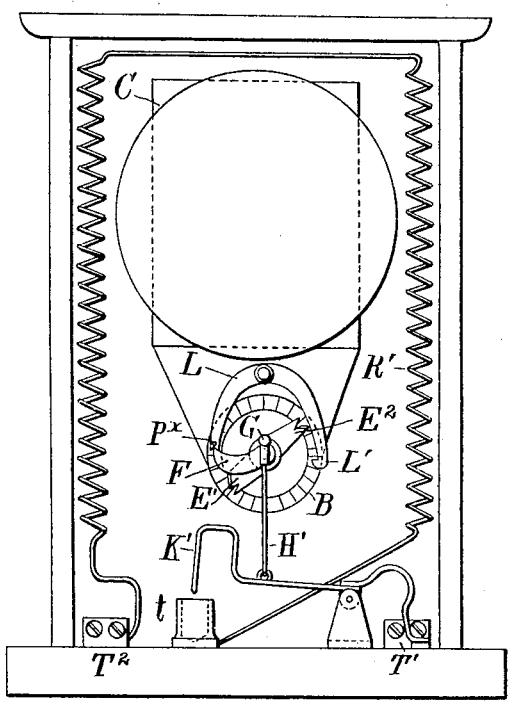
Figure 4:
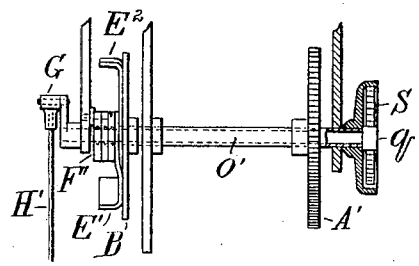
Figure 5:
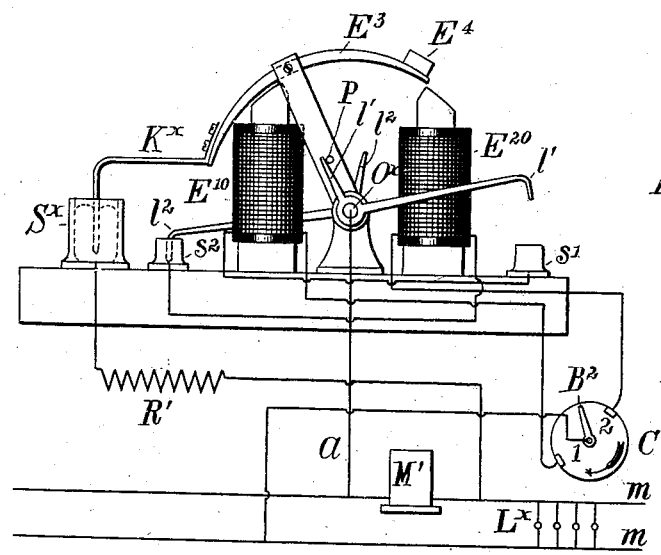
Figure 6:
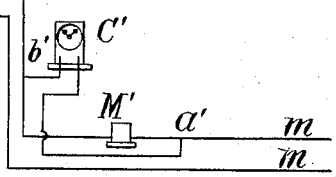

In the accompanying drawings, Figure 1 is a front elevation showing an arrangement of apparatus whereby the rate at which the meter registers is controlled by purely mechanical means, the apparatus being shown in vertical section. Fig. 2 is a plan to a larger scale of a part of such apparatus. Fig. 3 shows an arrangement by which the action of the switch is controlled. Fig. 4 is an enlarged side view, partly in section. Fig. 5 shows diagrammatically an arrangement in which a relay is used for moving the switch. Fig. 6 shows the general arrangement of apparatus when connected with the wires of a building.

A is a case fitting over the meter and containing the registering train of dials D of an electric meter and a clock C. The hand or rotary part of the clock, which makes one revolution in twenty-four hours, consists in this arrangement of a disk B, provided with operating or controlling devices which may consist of pallets E' E², arranged to strike a pin P$^\times$ on a forked lever L at predetermined times, which depend upon the position of the pallets relatively to the slots B' on the disks, on which the pallets are adjustably fixed by screws, as shown.

F is a finger or trigger connected to a crank-arm G and mounted to turn freely on the twenty-four-hour shaft, but connected with the twenty-four-hour disk by a spiral spring S. As the disk revolves clockwise the spiral spring tends to turn the trigger F also in a clockwise direction, but is prevented from doing so by reason of the tip of the trigger resting against the end of the forked lever L, as shown. At the proper time the pallet E² strikes against the pin P$^\times$ and moves it and the forked lever L sufficiently to the left to disengage the trigger, which, impelled by the spiral spring S, then flies round and catches in the projecting nose L' on the right-hand limb of the forked lever L. The pallet E² will have now passed the pin P$^\times$ and the pallet E' will be approaching it. At the proper time this latter pallet will strike the pin P$^\times$ from the outside and push the forked lever to the right, so as to disengage the trigger from the nose L' and allow the trigger to fly around into the position shown, in which it will be again caught and arrested by the left-hand limb of the forked lever. The crank-arm G is thus periodically turned from right to left. To the pin G' on this crank-arm is attached one end of a spiral spring S$^a$, the other end of which is attached by a loose ring to a second crank-arm K, fixed on a vertical spindle H. The spiral spring S acts as a connecting-rod between the two crank-arms G and K. M is a third crank-arm. It is fixed on the shaft H and engages with a clutch-coupling N, forming a part of differential gear with which the train D is provided. This gear comprises a toothed wheel O and a shaft o, that receive motion from the meter. To the shaft o are fixed toothed wheels P and Q, that transmit motion to toothed wheels P' and Q', respectively, which are loose on a shaft I, which is the shaft of the units-dial. As will be seen, the relative sizes of the toothed wheels P Q P' Q' are such that the wheel R and shaft I will for a given number of rotations of the shaft o make fewer revolutions when driven by the toothed wheels P P'.

R is a toothed wheel fast on the shaft I and gearing with a toothed wheel T on the shaft 10, which in the train corresponds to the dial on which tens of units are shown. The other wheels of the train are not shown, but are arranged as in ordinary counters.

The central portion of the shaft I is made square, and on it slides the clutch-coupling N. The arrangement is such that when the clutch-coupling is pressed by the lever-arm M under the action of the lever-arm G and spring S against the wheel Q', as shown in the drawing, the units-shaft I will be revolved from the shaft o at the normal rate, depending upon the relative sizes of the toothed wheels Q Q', and when the clutch-coupling is pressed against the toothed wheel P' by the reverse movement of the lever-arm G, K, and M, as above explained, the units-shaft will be revolved at another and slower rate, depending upon the relative sizes of the gear-wheels P P'. To reduce friction, I place a small roller on the free end of the lower arm M, as shown.

I may utilize power derived from the supply-circuit for making the clock self-winding in a manner well understood.

Fig. 3 is a similar view to Fig. 1, showing an arrangement by which the spring and trigger control the movements of a mercury-switch. Fig. 4 is an enlarged side view, partly in section. C represents the clock, as before. T' T² are the terminals of a mercury-switch K' and resistance R', which latter is so adjusted as to shunt a definite proportion of the current past the meter. The meter is not shown in the drawings; but it is to be understood that the terminals T' T² are connected with the terminals of the meter. The twenty-fourhour disk B, forked lever L, with pin P$^\times$ and nose L', trigger F, lever-arm G, and pallets E' E$^2$ are arranged and operated in a similar manner to the corresponding parts in the arrangement hereinbefore described. The spiral spring S also performs the same function as in the previously-described arrangement. It is placed between the solid shaft $q$ and a hollow shaft $o'$, Fig. 4. The wheel A', which receives motion from the clock C, is fast on the shaft $o'$. The disk B is also fast on this shaft. The trigger F and the lever-arm G are fast on the solid shaft $q$. The lever-arm G is connected by a rod H' with the pivoted switch-lever K', the free end of which when depressed dips into a mercury-terminal $t$. In the position shown the switch K' is open, and the motor portion of the meter runs at the full speed, so that the meter registers at or for the full rate and price. When the pallet E' strikes the pin P$^\times$, the trigger F flies over to the right, and the lever-arm G makes a half-revolution and depresses the switch-lever, whereby a definite proportion of current is shunted through the resistance R', and the motor or driving portion of the meter runs at lower speed, and the meter registers at or for the lower rate and price.

Fig. 5 shows diagrammatically an arrangement in which a relay is used for moving the switch. $m\ m$ are the supply-mains, and L$^\times$ are the lamps or other devices supplied with current therefrom. M' is the meter. C is a clock with a twenty-four-hour hand B$^2$ adapted to make contact at predetermined hours with the contact-pieces 1 2. E$^{10}$ E$^{20}$ are electromagnets, and E$^3$ is an armature arranged as a tumbling-lever pivoted at O$^\times$. The arm of this lever carries two pins $p$, one at each side, these pins being arranged to engage alternately with the short arms of bell-crank levers $l'\ l'$ and $l^2\ l^2$, respectively. The long arms of these levers dip when depressed into mercury-cups $s'$ and $s^2$, respectively. S$^\times$ is a large mercury-cup for the main switch K$^\times$. E$^4$ is a balance-weight for K. The various circuits and connections are clearly shown in the diagram. When the apparatus is in the position shown, a definite proportion of the current passes through $a$, E$^3$, K$^\times$, S$^\times$, and R', being shunted around the meter, so that the meter registers at or for the reduced rate. When the hand B$^2$ arrives at the contact 2, a relay current is sent through the electromagnet E$^{20}$, and the armature E$^3$ is thrown over to the right. This opens the switch K$^\times$, and the meter registers now at or for the full rate and price. As the armature tumbles over, the pin $p$ at the back strikes the short arm of the lever $l^2$, and thus breaks the relay-circuit at the mercury-cup $s^2$. At the same time the long arm of the lever $l'$ is allowed to dip into its mercury-cup $s'$, ready for the next operation when the clock-hand B$^2$ arrives at the contact 1, when a relay-current will be sent through the electromagnet E, whereby the switch K$^\times$ and lever $l^2$ will be again moved back into the positions shown, and the meter will again register at the reduced rate. By this arrangement it will be seen that the relay-current is cut off immediately after the main switch K$^\times$ has been thrown over, so that the contact for the relay-current is made by the clock-hand and broken by the relay-switches $l'\ l'\ l^2\ l^2$ alternately.

Fig. 6 shows the general arrangement of my apparatus in relation to the installation of electric wires in a building. $m\ m$ are the supply-mains, and M' is the meter, which may be placed in any desired position. My apparatus may be placed close to the meter, but may also be placed in any other and more convenient position. In the diagram I have shown it at C'. I connect it with the mains at the points $a'$ and $b'$. My object of connecting it in the way indicated is to eliminate any disturbing effect which might otherwise be caused by the resistance of the circuits. L$^\times$ represents the lamps or other apparatus supplied with current from the mains.

What I claim as my invention is—

1. The combination with an electric-meter apparatus, of means for changing the speed or rate of operation of the same for different hours of the day.

2. The combination with an electric-meter apparatus, of means controlled by a clock for changing the speed or rate of operation of the same for different hours of the day.

3. The combination with an electric-meter apparatus, of means for changing the speed of the electric driving portion thereof to change the rate of registry for different hours of the day.

4. The combination with an electric-meter apparatus, of means controlled by a clock for changing the speed of the electric driving portion thereof to change the rate of registry for different hours of the day.

5. The combination with an electric meter, of a switch governing the flow of the current in an operative portion of the same, of means controlled by a clock for operating the switch at predetermined times.

6. The combination with an electric-meter apparatus, of means for changing the flow of current in an operative portion of the same for different hours of the day.

7. In a two-rate electric meter, a controlling-clock having operating or controlling devices independently adjustable in position to vary the period of changed operation of the metering apparatus.

In testimony whereof I have signed my name to this specification in the presence of two subscribing witnesses.

GISBERT KAPP.

Witnesses:
  HENRY HASPER,
  CHAS. H. DAY.